United States Patent
Oki

(10) Patent No.: US 11,067,091 B2
(45) Date of Patent: Jul. 20, 2021

(54) TURBOCHARGER

(71) Applicant: TOYOTA JIDOSHA KABUSHIKI KAISHA, Toyota (JP)

(72) Inventor: Toshinori Oki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 69 days.

(21) Appl. No.: 16/563,010

(22) Filed: Sep. 6, 2019

(65) Prior Publication Data

US 2020/0096004 A1 Mar. 26, 2020

(30) Foreign Application Priority Data

Sep. 25, 2018 (JP) .............................. JP2018-178549

(51) Int. Cl.
| | | |
|---|---|---|
| *F01D 25/18* | (2006.01) | |
| *F16C 17/10* | (2006.01) | |
| *F04D 29/056* | (2006.01) | |
| *F01D 25/16* | (2006.01) | |

(52) U.S. Cl.
CPC ....... *F04D 29/0563* (2013.01); *F01D 25/162* (2013.01)

(58) Field of Classification Search
CPC ............. F05D 2220/40; F05D 2240/52; F05D 2240/54; F05D 2260/98; F05D 2240/70; F05D 2240/50; F16C 2360/24; F16C 17/10; F16C 17/18; F16C 33/1045; F16C 33/1025; F01D 25/18
See application file for complete search history.

(56) References Cited

U.S. PATENT DOCUMENTS

| | | | | |
|---|---|---|---|---|
| 4,389,052 A * | 6/1983 | Shimizu | .............. | F16C 33/1025 |
| | | | | 277/346 |
| 4,613,288 A * | 9/1986 | McInerney | ............. | F01D 25/24 |
| | | | | 417/407 |
| 4,721,441 A * | 1/1988 | Miyashita | ............. | F01D 25/164 |
| | | | | 384/518 |
| 6,709,160 B1 * | 3/2004 | Ward | ................... | F01D 25/166 |
| | | | | 384/286 |
| 9,903,226 B2 * | 2/2018 | Uneura | ................ | F01D 25/186 |
| 10,161,265 B2 * | 12/2018 | Isayama | ............... | F04D 29/051 |
| 2004/0057847 A1 * | 3/2004 | Wild | ...................... | F01D 25/186 |
| | | | | 417/407 |
| 2010/0218499 A1 * | 9/2010 | Shibui | ....................... | F02C 6/12 |
| | | | | 60/607 |
| 2017/0248032 A1 * | 8/2017 | Williams | ............... | F01D 25/162 |

(Continued)

FOREIGN PATENT DOCUMENTS

| | | |
|---|---|---|
| JP | S60-116035 U | 8/1985 |
| JP | 2004-132319 A | 4/2004 |

*Primary Examiner* — Long T Tran
(74) *Attorney, Agent, or Firm* — Oliff PLC

(57) ABSTRACT

A turbocharger includes a tubular floating bearing inserted into a bearing housing and a shaft inserted into the floating bearing. An annular slinger is arranged on an outer circumferential surface of at least one of opposite axial ends of the shaft, which protrudes from the float bearing. The bearing housing defines an oil discharge space surrounding the slinger externally in a radial direction. The bearing housing includes a guide wall protruding from an inner wall surface of the oil discharge space. The guide wall is configured to guide oil in the oil discharge space toward the oil discharge port.

10 Claims, 2 Drawing Sheets

(56) References Cited

U.S. PATENT DOCUMENTS

2017/0370409 A1* 12/2017 Burkinshaw ............ F16C 17/18
2018/0003081 A1*  1/2018 Isayama ................ F04D 29/063
2018/0003105 A1*  1/2018 Kojima .................. F02B 39/00
2019/0128140 A1*  5/2019 Gramsch ................ F01D 25/20

* cited by examiner

TURBOCHARGER

BACKGROUND

1. Field

The following description relates to a turbocharger.

2. Description of Related Art

Japanese Laid-Open Utility Model Publication No. 60-116035 describes a turbocharger in which a tubular floating bearing is inserted into a bearing housing. Further, a shaft that connects a turbine wheel and a compressor wheel to each other is inserted into the floating bearing. The shaft includes a shaft body having the form of a circular rod. Opposite axial ends of the shaft body protrude out of the floating bearing. A slinger protrudes outward in the radial direction from the outer circumferential surface of the ends of the shaft body. The slinger extends over the entire shaft body in the circumferential direction. In addition, an oil discharge space is defined in the bearing housing to surround the slinger of the shaft externally in the radial direction. Further, an oil discharge port is defined in the bearing housing to connect the oil discharge space to the outside of the bearing housing.

In the turbocharger of the above-described document, when the internal combustion engine is driven, oil is supplied into a gap between the inner circumferential surface of the floating bearing and the outer circumferential surface of the shaft body of the shaft. When the supplied oil flows in the axial direction of the shaft body to reach the slinger, the oil is dispersed in the oil discharge space of the bearing housing by the centrifugal force produced by rotation of the slinger. The oil in the oil discharge space is discharged out of the bearing housing through the oil discharge port.

In the turbocharger of Japanese Laid-Open Utility Model Publication No. 60-116035, the oil dispersed in the oil discharge space may remain in the oil discharge space without flowing toward the oil discharge port. If oil remains in the oil discharge space, the streams of the remaining oil may collide with each other and the stream of newly dispersed oil collides with the streams of the remaining oil, thereby producing bubbles in the oil. Thus, it is desired in the turbocharger of the above-described document that the oil dispersed in the oil discharge space of the bearing housing be quickly discharged out of the bearing housing from the oil discharge port.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A turbocharger includes a turbine housing that accommodates a turbine wheel, a compressor housing that accommodates a compressor wheel, a bearing housing that connects the turbine housing and the compressor housing to each other, a tubular floating bearing inserted into the bearing housing, and a shaft that connects the turbine wheel and the compressor wheel to each other. The shaft is inserted into the floating bearing. The shaft is rotatable relative to the floating bearing. The floating bearing and the shaft are configured to permit oil to be drawn into a gap between an inner circumferential surface of the floating bearing and an outer circumferential surface of the shaft. The shaft includes a shaft body having an axially central portion inserted into the floating bearing and opposite axial ends protruding from the floating bearing. The shaft also includes an annular slinger protruding outward in a radial direction from an outer circumferential surface of at least one of the opposite axial ends of the shaft body. The bearing housing defines an oil discharge space surrounding the slinger externally in the radial direction and an oil discharge port connecting the oil discharge space to an outside of the bearing housing. The bearing housing includes a guide wall protruding from an inner wall surface of the oil discharge space. The guide wall is configured to guide oil in the oil discharge space toward the oil discharge port.

In the above-described structure, oil dispersed in the oil discharge space is guided toward the oil discharge port. This allows the oil in the oil discharge space to be quickly discharged from the oil discharge port to the outside of the bearing housing.

In the above-described structure, the guide wall may extend along a line that passes through the guide wall and the oil discharge port.

In the above-described structure, the flow of oil in the oil discharge space can be regulated toward the oil discharge port. This allows the oil in the oil discharge space to be efficiently guided toward the oil discharge port.

In the above-described structure, the guide wall may be located at a position that at least partially overlaps the slinger in a axial direction of the shaft, the oil discharge port may be located at a position that does not overlap the slinger in the axial direction of the shaft, and the guide wall may extend to intersect a circumferential direction with respect to a central axis of the shaft.

In the above-described structure, oil dispersed from the slinger to the wall surface of the oil discharge space entirely flows in the circumferential direction with respect to the central axis of the shaft. This limits the flow of the oil in the axial direction of the shaft. In the above-described structure, the guide wall allows the flow of the oil in the circumferential direction to be changed to the flow toward the oil discharge port in the axial direction of the shaft. Thus, even if the position of the slinger and the position of the oil discharge port do not overlap each other in the axial direction of the shaft, oil is moved in the axial direction of the shaft and quickly discharged from the oil discharge port.

In the above-described structure, the guide wall may extend to become closer to the oil discharge port in the axial direction of the shaft toward a leading side in a rotation direction of the shaft.

In the above-described structure, when oil flowing in the circumferential direction with respect to the central axis of the shaft is guided toward the oil discharge port, the degree in which the flow direction of oil is changed can be reduced. This restricts situations in which oil is stirred and the flow of the oil is disturbed, which occur when the direction of the oil flow is excessively changed. As a result, the oil is prevented from remaining in the oil discharge space, which results from the disturbance of the oil flow.

In the above-described structure, a partition wall may protrude from the inner wall surface of the oil discharge space, the partition wall being configured to guide the oil in the oil discharge space toward the oil discharge port, the partition wall may extend along a line that passes through the partition wall and the oil discharge port, at least a part of the partition wall may be located at a position that overlaps the guide wall in an extension direction of the guide wall, and a spacing width between the guide wall and the partition wall in a direction that is orthogonal to the extension direction of the guide wall may decrease toward the oil discharge port.

In the above-described structure, a passage extending toward the oil discharge port is defined between the guide wall and the partition wall. The spacing width between the guide wall and the partition wall decreases toward the oil discharge port. Thus, the width of the passage defined by the guide wall and the partition wall decreases toward the oil discharge port. As a result, in the passage defined by the guide wall and the partition wall, oil flows faster toward the oil discharge port, thereby contributing to quick discharge of the oil from the oil discharge port.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

An embodiment will now be described with reference to FIGS. 1 to 4. First, the schematic structure of an internal combustion engine 100 for a vehicle will be described.

Figure 1:
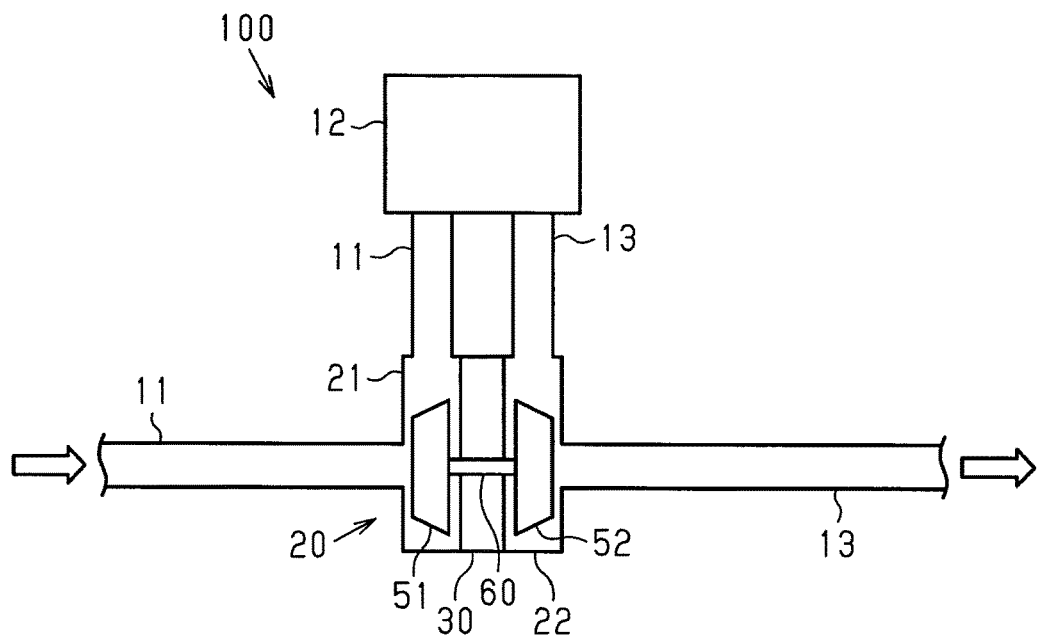
FIG. 1 is a schematic diagram of an internal combustion engine.

As shown in FIG. 1, the internal combustion engine 100 includes an intake passage 11, through which intake air flows from the outside of the internal combustion engine 100. The intake passage 11 is connected to a cylinder 12, which causes fuel to mix with intake air and burn. The cylinder 12 is connected to an exhaust passage 13, through which exhaust gas is discharged from the cylinder 12.

The internal combustion engine 100 includes a turbocharger 20, which compresses intake air using the flow of exhaust gas. The turbocharger 20 includes a compressor housing 21, which is coupled to the intake passage 11. The turbocharger 20 also includes a turbine housing 22, which is coupled to the exhaust passage 13. The compressor housing 21 and the turbine housing 22 are connected to each other by a bearing housing 30 of the turbocharger 20.

The turbine housing 22 accommodates a turbine wheel 52, which is rotated by the flow of exhaust gas. The turbine wheel 52 is connected to a first axial end of a shaft 60. An axially central portion of the shaft 60 is accommodated in the bearing housing 30 and rotationally supported. The compressor wheel 51 is connected to a second axial end of the shaft 60. The compressor wheel 51 is accommodated in the compressor housing 21.

The structure of the bearing housing 30 of the turbocharger 20 and the components related to the bearing housing 30 will now be described in detail. In the following description, it is assumed that the internal combustion engine 100 is mounted on a vehicle and the vertical direction of the vehicle is defined as the vertical direction of the turbocharger 20 (bearing housing 30 and the like).

Figure 2:
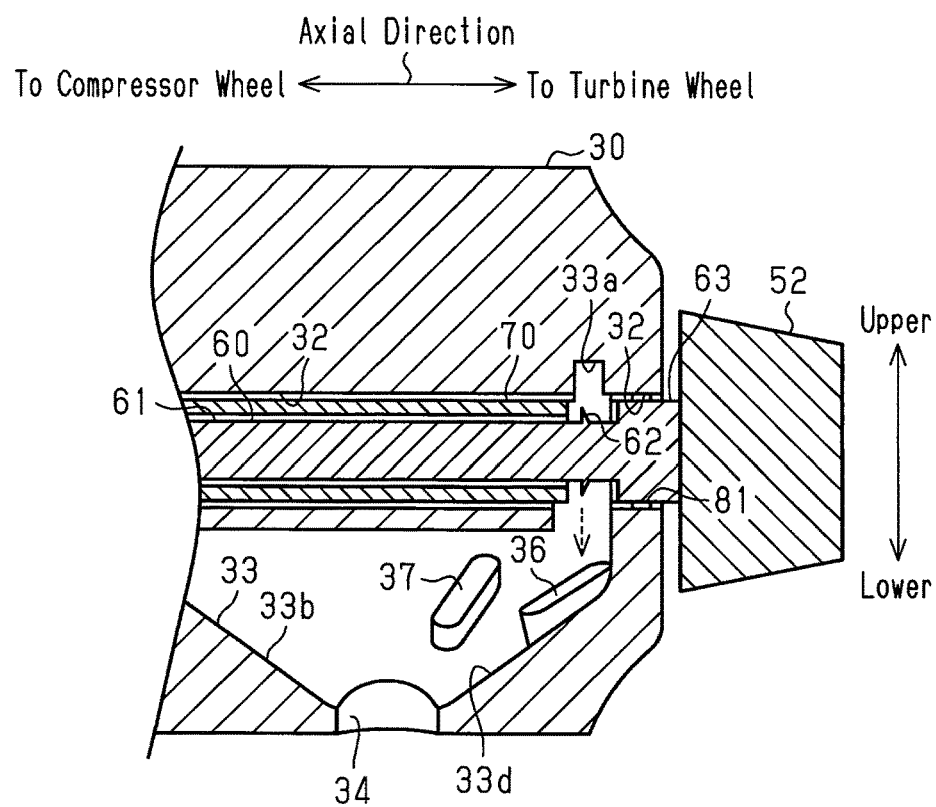
FIG. 2 is a cross-sectional view showing the peripheral structure of the bearing housing.

As shown in FIG. 2, the entire bearing housing 30 is cylindrical. A support hole 32, which is substantially cylindrical, is defined in a radially central portion of the bearing housing 30. The support hole 32 extends through the bearing housing 30 in the axial direction. Oil is drawn into the support hole 32 from the outside through an oil drawing passage (not shown).

A floating bearing 70, which is substantially tubular, is inserted into the support hole 32 of the bearing housing 30. The dimension of the floating bearing 70 in the axial direction is smaller than the dimension of the bearing housing 30 in the axial direction. The floating bearing 70 is arranged at the axially central portion of the bearing housing 30. That is, the opposite axial ends of the floating bearing 70 do not protrude out of the bearing housing 30.

The outer diameter of the floating bearing 70 is slightly smaller than the inner diameter of the support hole 32. The floating bearing 70 is positioned by a positioning member (not shown) and thus cannot be rotated with respect to the bearing housing 30 and cannot be moved in the axial direction. Oil is drawn through the oil drawing passage of the bearing housing 30 into a gap between the outer circumferential surface of the floating bearing 70 and the inner circumferential surface of the support hole 32. Thus, the floating bearing 70 is supported by the bearing housing 30 as if the floating bearing 70 is floating in the oil drawn into the gap between the outer circumferential surface of the floating bearing 70 and the inner circumferential surface of the support hole 32. The floating bearing 70 has an oil supply hole (not shown), which extends through the floating bearing 70 in the radial direction. Oil is supplied through the oil supply hole externally in the radial direction of the floating bearing 70 into the floating bearing 70.

The shaft 60 includes a shaft body 61, which is inserted into the floating bearing 70. The shaft body 61 has the form of a circular rod. The dimension of the shaft body 61 in the axial direction is larger than the dimension of the floating bearing 70 in the axial direction. In the bearing housing 30, the opposite axial ends of the shaft body 61 protrude out of the floating bearing 70. Oil is drawn through the oil supply hole of the floating bearing 70 into a gap between the outer circumferential surface of the shaft body 61 and the inner circumferential surface of the floating bearing 70. The shaft body 61 is rotationally supported by the oil supplied into the gap between the outer circumferential surface of the shaft body 61 and the inner circumferential surface of the floating bearing 70.

A cylindrical large-diameter portion 63 extends from a first axial end (right end of FIG. 2) of the shaft body 61 toward the turbine housing 22. The large-diameter portion 63 is coaxial with the shaft body 61. The outer diameter of the large-diameter portion 63 is larger than the outer diameter of the shaft body 61 and is smaller than the inner diameter of the support hole 32 of the bearing housing 30. Part of the large-diameter portion 63 pops out of the bearing housing 30 toward the turbine housing 22.

An annular seal ring 81 is coupled to the outer circumferential surface of the large-diameter portion 63 of the shaft 60. The inner diameter of the seal ring 81 is substantially the same as the outer diameter of the large-diameter portion 63. Further, the outer diameter of the seal ring 81 is substantially the same as the inner diameter of the support hole 32. Thus, the seal ring 81 prevents exhaust gas flowing in the turbine housing 22 from being leaked into the bearing housing 30. The end surface of the large-diameter portion 63 of the shaft 60 is connected to the above-described turbine wheel 52.

A first slinger 62 protrudes outward in the radial direction from the outer circumferential surface of the first axial end of the shaft body 61. The entire first slinger 62 extends in the circumferential direction of the shaft body 61 and is annular.

Although not shown in the drawings, the above-described compressor wheel 51 is connected to the second axial end of the shaft 60. A second slinger is arranged at a second axial end of the shaft body 61. The second slinger has substantially the same configuration as the first slinger 62.

As shown in FIG. 2, an oil discharge space 33 is defined in the bearing housing 30. Oil is discharged through the oil discharge space 33. The oil discharge space 33 has a lower space 33b, which is located below the floating bearing 70. Further, the dimension of the lower space 33b in the axial direction of the bearing housing 30 is larger than the dimension of the floating bearing 70 in the axial direction. More specifically, the lower space 33b extends from a position between the turbine housing 22 and the first slinger 62 to a position between the compressor housing 21 and the second slinger.

Figure 3:
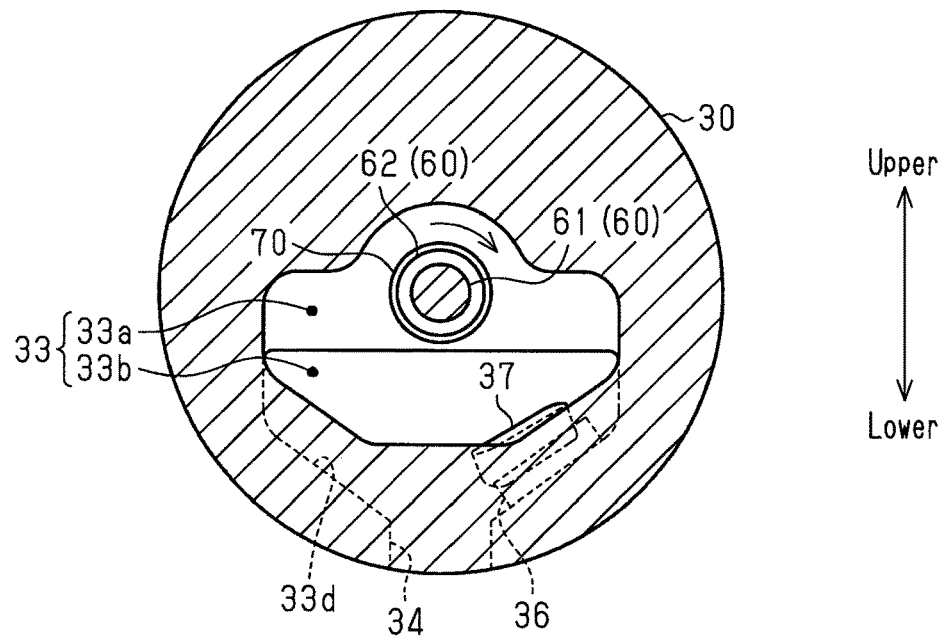
FIG. 3 is a cross-sectional view showing the peripheral structure of the bearing housing.

As shown in FIG. 2, the lower space 33b downwardly spreads toward the axially central portion from the axial ends of the bearing housing 30. Further, as shown in FIG. 3, when viewed in the axial direction of the bearing housing 30, the lower space 33b downwardly spreads toward the central portion of the bearing housing 30 in the horizontal direction (left-right direction in FIG. 3). That is, the lower surface of an inner wall surface 33d of the bearing housing 30, which defines the lower space 33b, is an inclined surface descending toward the central portion of the bearing housing 30.

As shown in FIG. 2, the end of the lower space 33b closer to the turbine housing 22 is connected to a first upper space 33a of the oil discharge space 33. As shown in FIG. 3, the first upper space 33a spreads to surround the first slinger 62 of the shaft 60 externally in the radial direction. Although not shown in the drawings, the end of the lower space 33b closer to the compressor housing 21 is connected to a second upper space of the oil discharge space 33. The second upper space spreads to surround the second slinger of the shaft 60 externally in the radial direction.

An oil discharge port 34 is defined in the bearing housing 30 to connect the oil discharge space 33 to the outside of the bearing housing 30. The oil discharge port 34 opens in the central portion of the lower space 33b of the oil discharge space 33. Thus, the oil discharge port 34 is located at a position that does not overlap the first slinger 62 and the second slinger in the axial direction of the shaft 60. Further, the oil discharge port 34 opens in the outer circumferential surface of the bearing housing 30. Thus, the oil discharge port 34 connects the lowermost part of the lower space 33b of the oil discharge space 33 to the outside of the bearing housing 30.

As shown in FIG. 2, a guide wall 36 protrudes from the inner wall surface 33d of the bearing housing 30, which defines the lower space 33b of the oil discharge space 33, to guide oil in the oil discharge space 33 toward the oil discharge port 34. The guide wall 36 extends along the inner wall surface 33d of the bearing housing 30 and is entirely rectangular. The guide wall 36 is located below the shaft 60. Further, a part of the guide wall 36 closer to the turbine housing 22 is located on a position overlapping the first slinger 62 in the axial direction of the shaft 60.

As shown in FIG. 3, in the present embodiment, the shaft 60 rotates clockwise when viewed from the turbine wheel 52 in the axial direction of the shaft 60. When viewed from the turbine wheel 52 in the axial direction of the shaft 60, the guide wall 36 is located on a retarding side (right side in FIG. 3) of the oil discharge port 34 in the rotation direction of the shaft 60.

The guide wall 36 extends to intersect the circumferential direction with respect to the central axis of the shaft 60. More specifically, the guide wall 36 extends to become closer to the oil discharge port 34 in the axial direction of the shaft 60 toward a leading side in the rotation direction of the shaft 60. As shown by the alternate long and short dashed line in FIG. 4, the extension angle of the guide wall 36 is determined such that a center 34a of the oil discharge port 34 is located on an extension 36a extending in the extension direction of the guide wall 36. The extension 36a is a straight line passing through the guide wall 36 and the center 34a of the oil discharge port 34. In the present embodiment, the guide wall 36 is inclined at an angle of approximately 45 degrees (approximately 135 degrees) with respect to the rotation direction of the shaft 60.

As shown in FIG. 2, a partition wall 37 protrudes from the inner wall surface 33d of the bearing housing 30, which defines the lower space 33b of the oil discharge space 33, to guide oil in the oil discharge space 33 toward the oil discharge port 34. The partition wall 37 extends along the inner wall surface 33d of the bearing housing 30 and is entirely rectangular. The partition wall 37 is located below the shaft 60. The partition wall 37 is located closer to the oil discharge port 34 than the guide wall 36 (located on the left side of the guide wall 36 in FIG. 2) in the axial direction of the shaft 60. Additionally, the partition wall 37 is located at a position that does not overlap the first slinger 62 and the second slinger in the axial direction of the shaft 60.

As shown in FIG. 3, when viewed from the turbine wheel 52 in the axial direction of the shaft 60, the partition wall 37 is located on the retarding side (right side in FIG. 3) of the oil discharge port 34 in the rotation direction of the shaft 60.

The partition wall 37 extends to intersect the circumferential direction with respect to the central axis of the shaft 60. More specifically, the partition wall 37 extends to become closer to the oil discharge port 34 in the axial direction of the shaft 60 toward the leading side in the rotation direction of the shaft 60. As shown by the alternate long and short dashed line in FIG. 4, the extension angle of the partition wall 37 is determined such that the center 34a of the oil discharge port 34 is located on an extension 37a extending in the extension direction of the guide wall 37. The extension 37a is a straight line passing through the partition wall 37 and the center 34a of the oil discharge port 34. In the present embodiment, the partition wall 37 is inclined at an angle of approximately 15 degrees (approximately 165 degrees) with respect to the rotation direction of the shaft 60.

Figure 4:
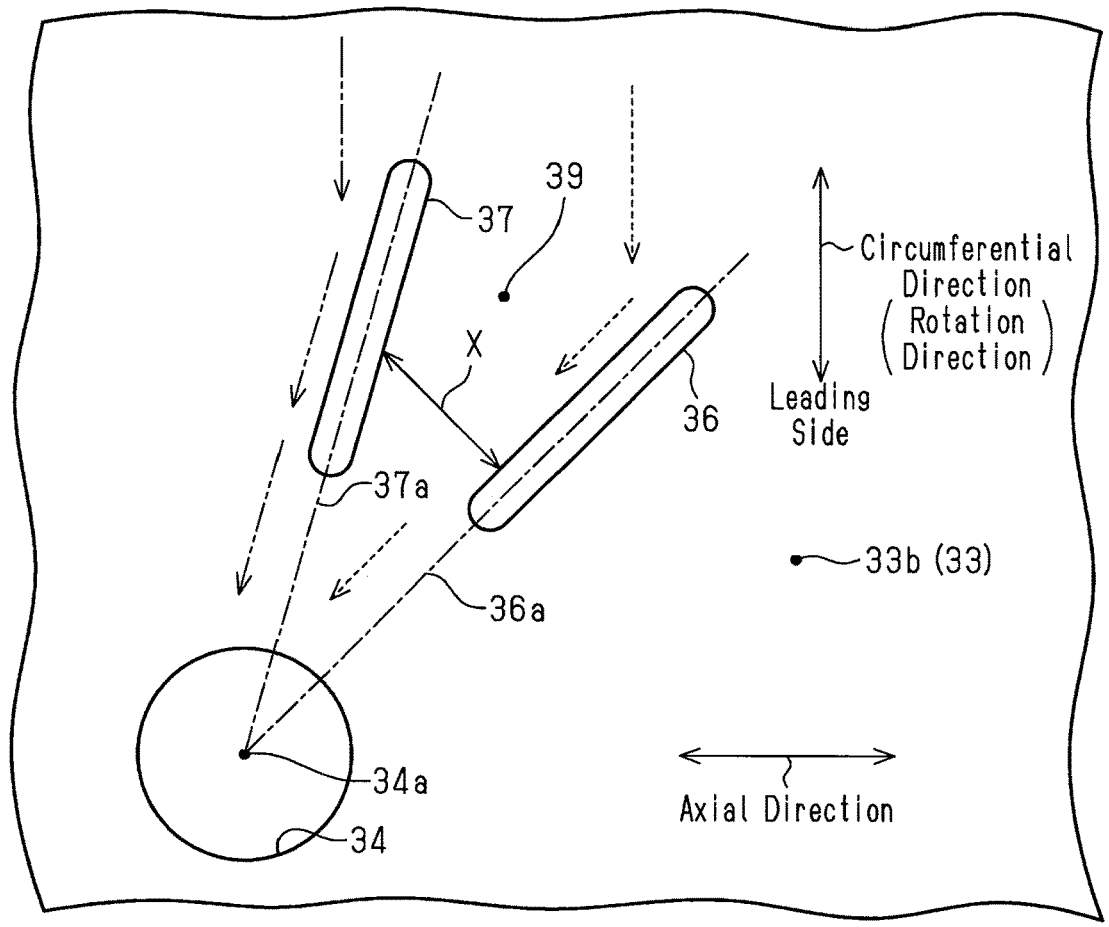
FIG. 4 is a developed view showing the oil discharge space.

As shown in FIG. 4, most of the partition wall 37 is located on a position that overlaps the guide wall 36 in the extension direction of the guide wall 36. The partition wall 37 is spaced away from the guide wall 36 in a direction that is orthogonal to the extension direction of the guide wall 36. As described above, the extension angle of the partition wall 37 with respect to the rotation direction of the shaft 60 differs from the extension angle of the guide wall 36 with respect to the rotation direction of the shaft 60. That is, in the present embodiment, the partition wall 37 is inclined at an angle of approximately 30 degrees with respect to the extension direction of the guide wall 36. As a result, a spacing width X, which is between the partition wall 37 and the guide wall 36 in the direction orthogonal to the extension direction of the guide wall 36, decreases toward the oil discharge port 34. Thus, the width of a passage 39, which is defined by the partition wall 37 and the guide wall 36, decreases toward the oil discharge port 34.

The operation and advantages of the present embodiment will now be described.

Some of the oil circulating throughout the entire internal combustion engine 100 is drawn into the support hole 32 through the oil drawing passage in the bearing housing 30. Some of the oil drawn into the support hole 32 is also drawn into a gap between the inner circumferential surface of the floating bearing 70 and the outer circumferential surface of the shaft body 61. The oil drawn into the gap between the inner circumferential surface of the floating bearing 70 and the outer circumferential surface of the shaft body 61 flows toward the end of the floating bearing 70 closer to the turbine wheel 52.

Some of the oil that has flowed to the end of the floating bearing 70 closer to the turbine wheel 52 flows through the shaft body 61 in the axial direction of the shaft 60 to reach the first slinger 62. Then, the oil that has flowed to the first slinger 62 is dispersed in the oil discharge space 33 by the centrifugal force produced by rotation of the first slinger 62. The oil dispersed in the oil discharge space 33 by the rotation of the first slinger 62 is diagonally dispersed outward in the radial direction of the first slinger 62 and toward the leading side in the rotation direction of the first slinger 62 and thus easily flows in the oil discharge space 33 toward the leading side in the rotation direction of the shaft 60 with respect to the central axis of the shaft 60. Particularly, in the present embodiment, the oil discharge port 34 is located at the position that does not overlap the first slinger 62 in the axial direction of the shaft 60. Thus, when oil flows in the oil discharge space 33 toward the leading side in the rotation direction of the shaft 60 and does not easily flow in the axial direction of the shaft 60, the oil may remain in the oil discharge space 33. If oil remains in the oil discharge space 33 in such a manner, the streams of the remaining oil may collide with each other and the stream of newly dispersed oil collides with the streams of the remaining oil, thereby producing bubbles in the oil.

In the present embodiment, the guide wall 36 is located at the position overlapping the first slinger 62 in the axial direction of the shaft 60. Thus, as shown by the arrows of the broken lines in FIG. 4, the flow of the oil dispersed from the first slinger 62 and toward the leading side in the rotation direction of the shaft 60 is obstructed by the guide wall 36. Further, the guide wall 36 extends to become closer to the oil discharge port 34 in the axial direction of the shaft 60 toward the leading side in the rotation direction of the shaft 60. Thus, the present embodiment allows oil to quickly flow into the oil discharge port 34 while utilizing some of the force that causes the oil to flow toward the leading side in the rotation direction of the shaft 60. In other words, this prevents the flow of the oil from being obstructed by the guide wall 36 and changed excessively, thereby preventing oil from being stirred around the guide wall 36 and preventing the flow of the oil from being disturbed.

In addition, as shown in FIG. 4, the center 34a of the oil discharge port 34 is located on the extension 36a in the extension direction of the guide wall 36. Thus, as shown by the arrows of the broken lines in FIG. 4, the flow of oil regulated by the guide wall 36 is generally oriented toward the center 34a of the oil discharge port 34. This prevents situations in which the oil regulated by the guide wall 36 diverts from the oil discharge port 34 and flows into other portions in the oil discharge space 33. This ensures that oil is guided toward the oil discharge port 34, thereby contributing to quick discharge of the oil.

In the present embodiment, the passage 39 is defined between the guide wall 36 and the partition wall 37. The width (spacing width X) of the passage 39 decreases toward the oil discharge port 34. Thus, oil flows faster into the passage 39 toward the oil discharge port 34. This limits situations in which oil remains in the passage 39, thereby contributing to quick discharge of the oil from the oil discharge port 34 out of the bearing housing 30.

In the present embodiment, the partition wall 37 also extends to become closer to the oil discharge port 34 in the axial direction of the shaft 60 toward the leading side in the rotation direction of the shaft 60. Further, the center 34a of the oil discharge port 34 is located on the extension 37a in the extension direction of the partition wall 37. Thus, as shown by the arrows of the long dashed double-short dashed lines in FIG. 4, the flow of the oil toward the partition wall 37 is regulated by the partition wall 37 toward the oil discharge port 34 and guided toward the oil discharge port 34. Additionally, the partition wall 37 defines the passage 39 with the guide wall 36 and guides the oil flowing in the passage 39 toward the oil discharge port 34. That is, although the partition wall 37 is not located at the position overlapping the first slinger 62 in the axial direction of the shaft 60, the partition wall 37 also serves as a guide wall that guides oil.

The present embodiment may be modified as follows. The present embodiment and the following modifications can be combined as long as the combined modifications remain technically consistent with each other.

In the above-described embodiment, the position of the guide wall 36 may be changed. For example, the guide wall 36 may be located closer to the oil discharge port 34 than the first slinger 62 in the axial direction of the shaft 60 and may be located at the position that does not overlap the first slinger 62. Even in this structure, as compared to a structure in which the bearing housing 30 does not include the guide wall 36, oil in the oil discharge space 33 can be guided toward the oil discharge port 34.

The guide wall 36 may be located closer to the compressor wheel 51 than the oil discharge port 34 in the axial direction of the shaft 60. Even in this structure, in the oil discharge space 33, oil can be guided to the oil discharge port 34 by blocking the flow of oil toward the compressor wheel 51 over the oil discharge port 34 from the first slinger 62.

When viewed from the turbine wheel 52 in the axial direction of the shaft 60, the guide wall 36 may be located on the leading side of the oil discharge port 34 in the rotation direction of the shaft 60. Even in this structure, oil can be guided toward the oil discharge port 34 by blocking the flow of oil toward the leading side in the rotation direction of the shaft 60.

In the same manner, the position of the partition wall 37 may be changed. For example, the partition wall 37 may be located at the position overlapping the first slinger 62 in the axial direction of the shaft 60. Alternatively, the guide wall 37 may be located closer to the compressor wheel 51 than the oil discharge port 34 in the axial direction of the shaft 60. Further, when viewed from the turbine wheel 52 in the axial direction of the shaft 60, the guide wall 37 may be located on the leading side of the oil discharge port 34 in the rotation direction of the shaft 60.

In the above-described embodiment, the position of the partition wall 37 relative to the guide wall 36 may be changed. For example, the entire partition wall 37 may overlap the guide wall 36 in the extension direction of the guide wall 36.

In the above-described embodiment, the extension direction of the guide wall 36 may be changed. For example, the guide wall 36 may extend in a direction that is orthogonal to the rotation direction of the shaft 60. Even in this structure, oil can be guided toward the oil discharge port 34 by blocking the flow of oil toward the leading side in the rotation direction of the shaft 60 in the oil discharge space 33. Further, the guide wall 36 may extend in the circumferential direction with respect to the central axis of the shaft 60. For example, the guide wall 36 extending in the circumferential direction may be located at the position overlapping the oil discharge port 34 in the axial direction of the shaft 60. Even in this structure, in the oil discharge space 33, oil can be guided to the oil discharge port 34 by blocking the flow of oil toward the compressor wheel 51 over the oil discharge port 34 from the first slinger 62.

The oil discharge port 34 does not have to be located on the extension 36a in the extension direction of the guide wall 36. As long as the extension direction of the entire guide wall 36 is entirely oriented toward the oil discharge port 34, oil in the oil discharge space 33 can be guided toward the oil discharge port 34.

In the same manner, the extension direction of the partition wall 37 may be changed. For example, the partition wall 37 may extend in a direction that is orthogonal to the rotation direction of the shaft 60. Even in this structure, oil can be guided toward the oil discharge port 34 by blocking the flow of oil toward the leading side in the rotation direction of the shaft 60 in the oil discharge space 33. Further, the partition wall 37 may extend in the circumferential direction with respect to the central axis of the shaft 60.

The oil discharge port 34 does not have to be located on the extension 37a in the extension direction of the partition wall 37. As long as the extension direction of the entire partition wall 37 is entirely oriented toward the oil discharge port 34, oil in the oil discharge space 33 can be guided toward the oil discharge port 34.

In the above-described embodiment, the spacing width X between the partition wall 37 and the guide wall 36 may be changed. For example, the spacing width X between the partition wall 37 and the guide wall 36 in the direction orthogonal to the extension direction of the guide wall 36 may increase or remain unchanged toward the oil discharge port 34. Even in this structure, as long as the passage 39 is defined by the partition wall 37 and the guide wall 36, oil in the passage 39 is easily guided toward the oil discharge port 34.

In the above-described embodiment, the number of guide walls 36 may be changed. For example, in some cases, when the flow rate of oil flowing in the oil discharge space 33 is large, oil can be efficiently guided with a larger number of guide walls. When multiple guide walls are arranged, some of the guide walls can also serve as partition walls.

In the above-described embodiment, the shapes and/or positions of the oil discharge space 33 and the oil discharge port 34 may be changed. For example, the lower space 33b of the oil discharge space 33 may spread downward toward the turbine wheel 52 in the axial direction of the bearing housing 30. Further, the oil discharge port 34 may be located at the position overlapping the first slinger 62 in the axial direction of the shaft 60.

In the above-described embodiment, in addition to or instead of the guide wall 36, a guide wall corresponding to the second slinger of the shaft 60 may be arranged. For example, the guide wall may protrude from the portion of the inner wall surface 33d of the bearing housing 30 located closer to the compressor wheel 51 than the oil discharge port 34. In the same manner, in addition to or instead of the partition wall 37, a partition wall corresponding to the second slinger of the shaft 60 may be arranged.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:
1. A turbocharger comprising:
a turbine housing that accommodates a turbine wheel;
a compressor housing that accommodates a compressor wheel;
a bearing housing that connects the turbine housing and the compressor housing to each other;
a tubular floating bearing inserted into the bearing housing; and
a shaft that connects the turbine wheel and the compressor wheel to each other, the shaft being inserted into the floating bearing, wherein
the shaft is rotatable relative to the floating bearing,
the floating bearing and the shaft are configured to permit oil to be drawn into a gap between an inner circumferential surface of the floating bearing and an outer circumferential surface of the shaft,
the shaft includes
  a shaft body having an axially central portion inserted into the floating bearing and opposite axial ends protruding from the floating bearing, and
  an annular slinger protruding outward in a radial direction from an outer circumferential surface of at least one of the opposite axial ends of the shaft body,
the bearing housing defines an oil discharge space surrounding the slinger externally in the radial direction and an oil discharge port connecting the oil discharge space to an outside of the bearing housing,
the bearing housing includes a guide wall protruding from an inner wall surface of the oil discharge space, the guide wall being configured to guide oil in the oil discharge space toward the oil discharge port, and the guide wall includes a surface that extends to intersect a circumferential direction with respect to a central axis of the shaft, the surface being arranged to face a direction opposite to a rotation direction of the shaft to obstruct a flow of the oil that is dispersed from the slinger and toward a leading side in the rotation direction of the shaft.

2. The turbocharger according to claim 1, wherein the guide wall extends along a line that passes through the guide wall and the oil discharge port.

3. The turbocharger according to claim 1, wherein
the guide wall is located at a position that at least partially overlaps the slinger in a axial direction of the shaft, and
the oil discharge port is located at a position that does not overlap the slinger in the axial direction of the shaft.

4. The turbocharger according to claim 3, wherein the guide wall extends to become closer to the oil discharge port in the axial direction of the shaft toward the leading side in the rotation direction of the shaft.

5. The turbocharger according to claim 1, further comprising a partition wall protruding from the inner wall surface of the oil discharge space, the partition wall being configured to guide the oil in the oil discharge space toward the oil discharge port, wherein
the partition wall extends along a line that passes through the partition wall and the oil discharge port,
at least a part of the partition wall is located at a position that overlaps the guide wall in an extension direction of the guide wall, and
a spacing width between the guide wall and the partition wall in a direction that is orthogonal to the extension direction of the guide wall decreases toward the oil discharge port.

6. The turbocharger according to claim 1, further comprising a partition wall protruding from the inner wall surface of the oil discharge space, the partition wall being configured to guide the oil in the oil discharge space toward the oil discharge port, wherein
the guide wall extends along a line that passes through the guide wall and a center of the oil discharge port,
the partition wall extends along a line that passes through the partition wall and the center of the oil discharge port,
at least a part of the partition wall is located at a position that overlaps the guide wall in an extension direction of the guide wall, and
a spacing width between the guide wall and the partition wall in a direction that is orthogonal to the extension direction of the guide wall decreases toward the oil discharge port.

7. The turbocharger according to claim 1, wherein the guide wall is located only at a specific position in the circumferential direction with respect to the central axis of the shaft.

8. The turbocharger according to claim 7, wherein, when viewed from the turbine wheel in an axial direction of the shaft, the guide wall is located on a retarding side of the oil discharge port in the rotation direction of the shaft.

9. A turbocharger comprising:
a turbine housing that accommodates a turbine wheel;
a compressor housing that accommodates a compressor wheel;
a bearing housing that connects the turbine housing and the compressor housing to each other;
a tubular floating bearing inserted into the bearing housing; and
a shaft that connects the turbine wheel and the compressor wheel to each other, the shaft being inserted into the floating bearing, wherein
the shaft is rotatable relative to the floating bearing,
the floating bearing and the shaft are configured to permit oil to be drawn into a gap between an inner circumferential surface of the floating bearing and an outer circumferential surface of the shaft,
the shaft includes
a shaft body having an axially central portion inserted into the floating bearing and opposite axial ends protruding from the floating bearing, and
an annular slinger protruding outward in a radial direction from an outer circumferential surface of at least one of the opposite axial ends of the shaft body,
the bearing housing defines an oil discharge space surrounding the slinger externally in the radial direction and an oil discharge port connecting the oil discharge space to an outside of the bearing housing,
the bearing housing includes a guide wall protruding from an inner wall surface of the oil discharge space, the guide wall being configured to guide oil in the oil discharge space toward the oil discharge port, and
the guide wall is located only at a specific position in a circumferential direction with respect to a central axis of the shaft.

10. The turbocharger according to claim 9, wherein, when viewed from the turbine wheel in an axial direction of the shaft, the guide wall is located on a retarding side of the oil discharge port in a rotation direction of the shaft.

* * * * *